No. 821,227. PATENTED MAY 22, 1906.
T. V. ELLIOTT.
OSCILLATING VALVE FOR STEAM ENGINES.
APPLICATION FILED MAY 11, 1905.
2 SHEETS—SHEET 1.
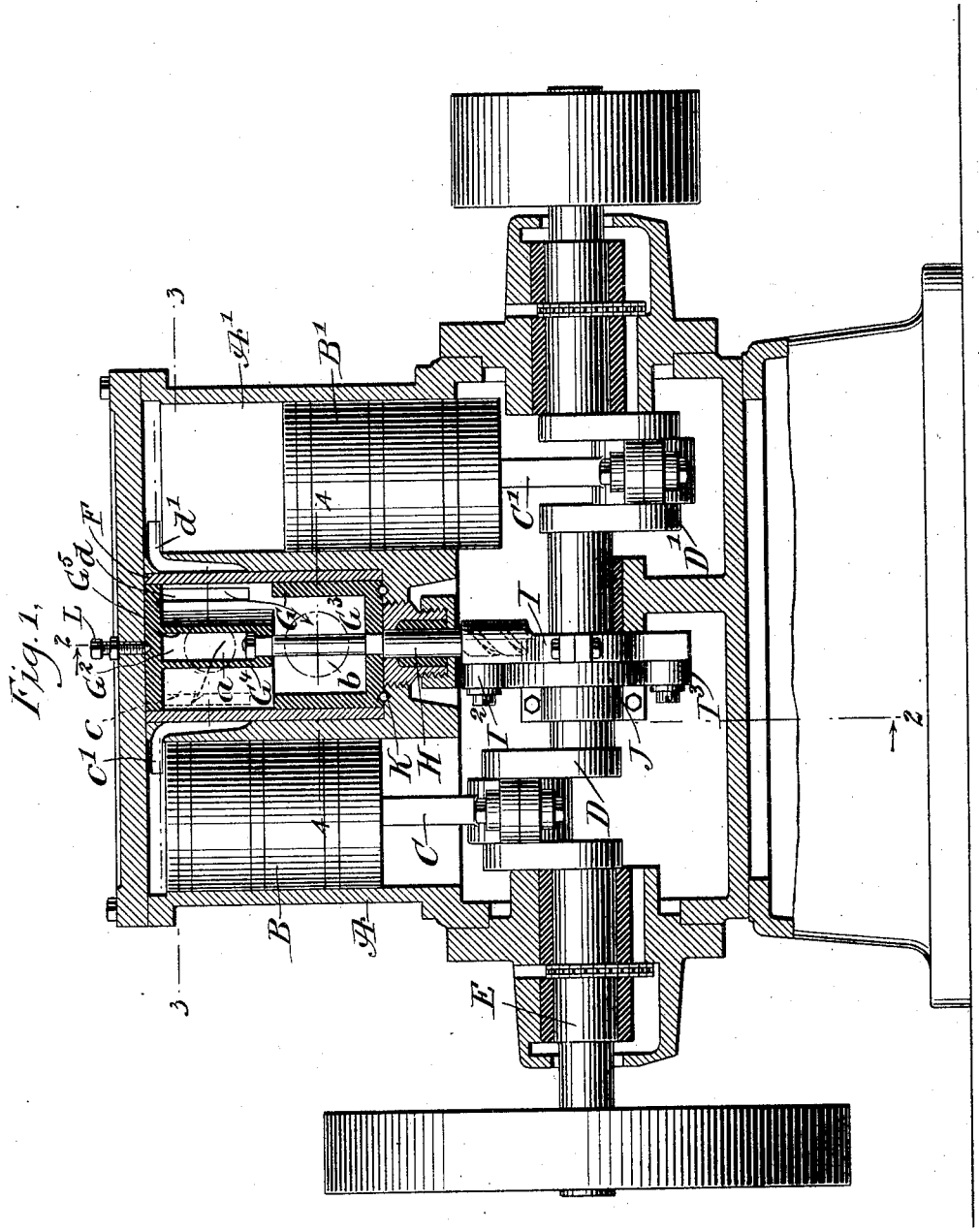
WITNESSES:
Edward Thorpe
Rev. G. Hoster
INVENTOR
Thaddious V. Elliott
BY
ATTORNEYS No. 821,227. PATENTED MAY 22, 1906.
T. V. ELLIOTT.
OSCILLATING VALVE FOR STEAM ENGINES.
APPLICATION FILED MAY 11, 1905.
2 SHEETS—SHEET 2.
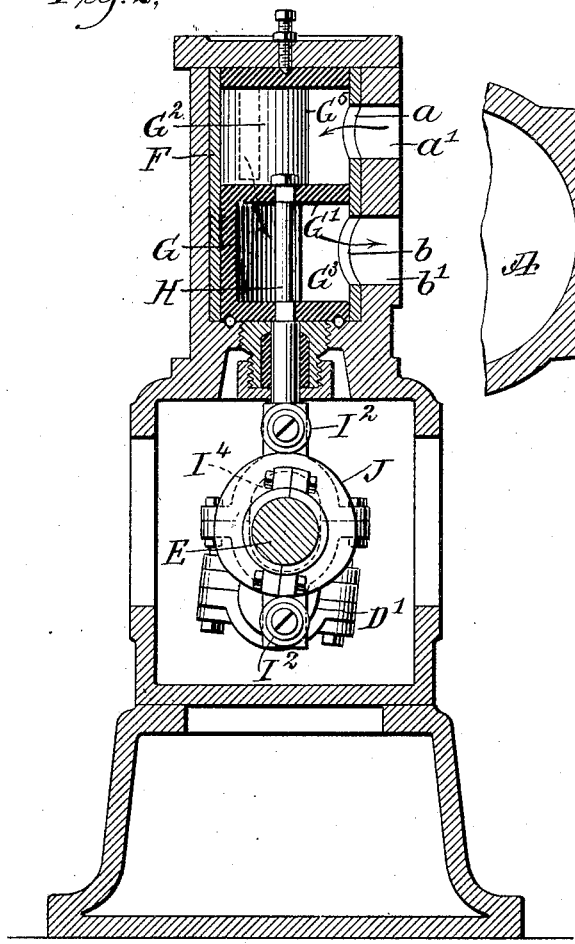
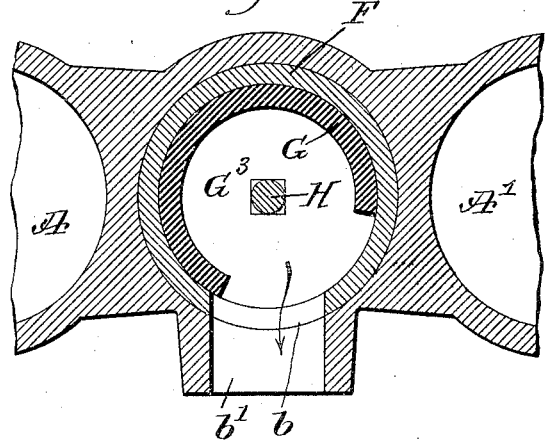
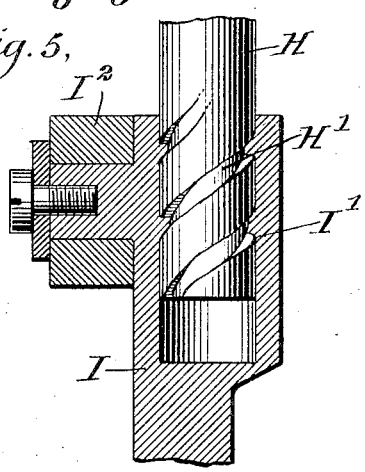
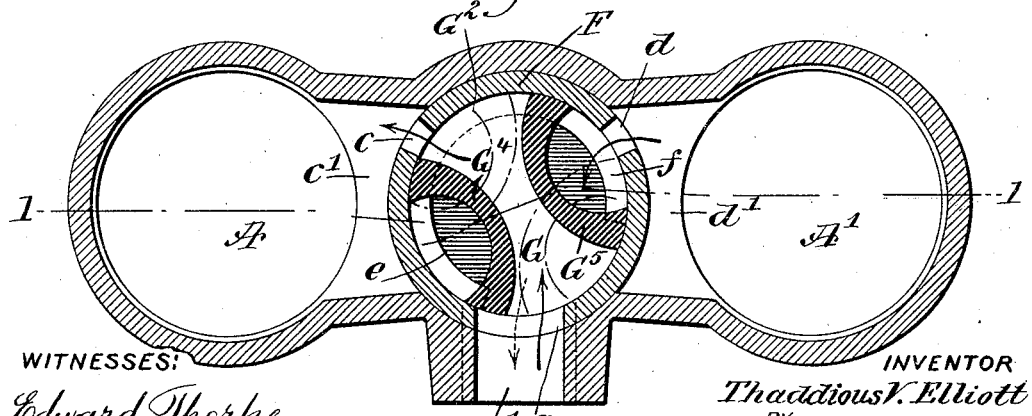
WITNESSES:
Edward Thorpe
Geo. J. Foster
INVENTOR
Thaddious V. Elliott
BY
Munn
ATTORNEYS

UNITED STATES PATENT OFFICE.

THADDIOUS V. ELLIOTT, OF NEW YORK, N. Y.

OSCILLATING VALVE FOR STEAM-ENGINES.

No. 821,227.　　　Specification of Letters Patent.　　　Patented May 22, 1906.

Application filed May 11, 1905. Serial No. 259,899.

*To all whom it may concern:*

Be it known that I, THADDIOUS V. ELLIOTT, a citizen of the United States, and a resident of the city of New York, Flatbush, borough of Brooklyn, in the county of Kings and State of New York, have invented a new and Improved Oscillating Valve for Steam-Engines, of which the following is a full, clear, and exact description.

The invention relates to the two-cylinder type of reciprocating engines; and its object is to provide a new and improved oscillating valve for controlling the admission and exhaust of the motive agent to and from the cylinders in a very simple manner and without danger of leakage of the motive agent.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a sectional side elevation of the improvement as applied on a two-cylinder engine, the section being on the line 1 1 of Fig. 3. Fig. 2 is a cross-section of the same on the line 2 2 of Fig. 1. Fig. 3 is an enlarged sectional plan view of the same on the line 3 3 of Fig. 1. Fig. 4 is a similar view of the same on the line 4 4 of Fig. 1, and Fig. 5 is an enlarged sectional side elevation of the cross-head and its connection with the stem of the oscillating valve.

In the cylinders A and A' of the engine are mounted to reciprocate pistons B and B', connected by pitmen C and C' with crank-arms D and D', arranged on the main shaft E and set at an angle one relative to the other, as is usual in engines of this type.

Between the cylinders A and A' is held a bushing F, in which is mounted to oscillate a valve G, having its vertically-disposed valve-stem H extending downwardly through a suitable stuffing-box to the outside, and on the outer end of this valve-stem H is arranged a spiral H', engaged by a pin or a similar device I', held on a yoke I, provided with friction-rollers I² and I³ in engagement with the peripheral surface of a cam J, secured on the main shaft E. The yoke I is provided with an elongated aperture I⁴, (see dotted lines, Fig. 2,) through which passes loosely the shaft E, it being understood that when the engine is in motion and the shaft E is rotated, and with it the cam J, then the latter imparts an up-and-down reciprocating motion to the yoke I, which by its connection with the spiral groove H' of the valve-stem H rocks the latter, and consequently oscillates the valve G in its bushing F. In order to insure an easy running of the valve G, the bottom thereof is mounted on a suitable ball-bearing K, as plainly indicated in Fig. 1, and the top of the said valve is centrally engaged by a center L.

In the bushing F is arranged an inlet-port $a$, registering with a cylinder inlet-port $a'$, connected by a pipe with a source of motive-agent supply, such as a boiler, and in the said bushing F is also arranged an outlet-port $b$, in register with an exhaust-port $b'$, through which passes the exhaust-steam to a suitable place of discharge by means of an exhaust-pipe or otherwise. The oscillating valve G is made cylindrical and is provided with a horizontally-disposed partition G', forming a steam-inlet chamber G² and an exhaust-chamber G³, the inlet-chamber G² being in register at all times with the inlet-port $a$ and the exhaust-chamber G³ being in register at all times with the exhaust-port $b$. (See Figs. 3 and 4.) The inlet-chamber G² is adapted to connect alternately with ports $c$ and $d$, formed in the bushing F and in register at all times with the cylinder-ports $c'$ and $b'$, leading into the upper or working ends of the cylinders A and A', respectively. In the chamber G² extend oppositely-disposed vertical partitions G⁴ and G⁵, which form passages $e$ and $f$, both opening at their lower ends into the exhaust-chamber G³. The upper end of the passage $e$ is adapted to connect with the port $c$, and the upper end of the passage $f$ is adapted to connect with the port $d$, said passages being, however, arranged in such manner that when the chamber G² is in register with the port $c$ then the port $d$ is in register with the passage $f$, while the passage $e$ is out of register with the port $c$. When the valve G is oscillated and reaches its extreme position, as shown in dotted lines in Fig. 3, then the passage $f$ is cut off from the port $d$, and the passage $e$ connects with the port $c$, and the chamber G² connects with the port $d$.

When the engine is in operation and the several parts are in the position shown in the drawings, then the motive agent passing through the port $a$ into the chamber G² can pass by way of the ports $c$ $c'$ into the upper end of the cylinder A to act on the piston B therein, so as to force the latter in a downward direction. While this takes place the upper end of the other cylinder A' is connected by way of the ports d' d and passage f with the exhaust-chamber G³, open at all times with the exhaust-ports b b' to allow the motive agent to exhaust from the cylinder A'. While the piston B is descending the other piston B' is rising, so that the motive agent is completely exhausted from the cylinder A'. When the piston B in its downward stroke reaches a cut-off position governed by the shape of the cam J, then the latter causes a turning of the valve G to move the same to its extreme other position above described, so that the motive agent is now shut off from the cylinder A, to allow the steam in the cylinder A to act expansively until the piston B reaches its lowermost position. When this takes place, the piston B' reaches its uppermost position, and the valve G is now turned sufficiently to connect the chamber G² with the port d, so as to allow the motive agent to pass into the upper end of the cylinder A' to act on the piston B' therein and force the same downward on its downstroke. During this time the piston B rises, and as the port c is now in register with the passage e it is evident that the exhaust-steam in the cylinder A can escape by way of the ports c and c', passage e, chamber G³, and exhaust-ports b b'. It is understood that by giving different forms to the cam J the valve G can be turned to cut off sooner or later relative to the chamber G² and the ports c and d.

The mechanism for oscillating the valve directly from the main shaft E may be varied without deviating from the spirit of my invention, it being understood that by the particular construction of the valve G described and shown the motive agent is admitted and exhausted from the cylinders A and A' in the proper sequence to insure an easy running of the engine, to utilize the motive agent to the fullest advantage, and to prevent undue leakage of steam.

Having thus described my invention, I claim as new and desire to secure by Letters Patent—

1. An engine comprising cylinders, pistons reciprocating therein, a main shaft having crank-arms standing at an angle and connected with the said pistons, an oscillating valve actuated from the said main shaft and controlling the admission and the exhaust of the motive agent to and from the said cylinders in the proper sequence, and mechanism for oscillating the said valve, comprising a cam on the main shaft and a yoke reciprocated by the said cam and engaging the stem of the said valve to rotate the latter.

2. An engine comprising cylinders, pistons reciprocating therein, a main shaft having crank-arms standing at an angle and connected with the said pistons, an oscillating valve having a fixed valve-stem provided with a spiral, a yoke engaging the said spiral, to oscillate the latter on reciprocating the yoke, and a cam on the main shaft, engaging the said yoke to reciprocate the same.

In testimony whereof I have signed my name to this specification in the presence of two subscribing witnesses.

THADDIOUS V. ELLIOTT.

Witnesses:
F. W. HANAFORD,
EVERARD B. MARSHALL.